(12) United States Patent
Draper et al.

(10) Patent No.: US 8,523,994 B2
(45) Date of Patent: Sep. 3, 2013

(54) METHOD FOR REDUCING HYDROGEN SULFIDE EVOLUTION FROM ASPHALT

(75) Inventors: Jennifer D. Draper, Bryan, TX (US); Mark R. Williams, Katy, TX (US); Weldon J. Cappel, Houston, TX (US); Jerry J. Weers, Richmond, TX (US)

(73) Assignee: Baker Hughes Incorporated, Houston, TX (US)

( * ) Notice: Subject to any disclaimer, the term of this patent is extended or adjusted under 35 U.S.C. 154(b) by 903 days.

(21) Appl. No.: 12/331,176

(22) Filed: Dec. 9, 2008

(65) Prior Publication Data

US 2009/0145330 A1 Jun. 11, 2009

Related U.S. Application Data

(60) Provisional application No. 61/043,935, filed on Apr. 10, 2008, provisional application No. 61/007,168, filed on Dec. 11, 2007.

(51) Int. Cl.
*C09D 195/00* (2006.01)
*C08L 95/00* (2006.01)
*C10C 3/02* (2006.01)
*C09D 7/12* (2006.01)

(52) U.S. Cl.
CPC ............ *C09D 195/00* (2013.01); *C09D 7/1258* (2013.01); *C08L 95/00* (2013.01); *C08L 2555/32* (2013.01); *C08L 2555/50* (2013.01); *C10C 3/023* (2013.01)
USPC .............................. 106/284.3; 208/39; 208/44

(58) Field of Classification Search
USPC .................................. 106/284.3; 208/39, 44
See application file for complete search history.

(56) References Cited

U.S. PATENT DOCUMENTS

| | | | |
|---|---|---|---|
| 3,985,861 A | 10/1976 | Hudson, Jr. | |
| 4,978,512 A | 12/1990 | Dillon | |
| 5,000,835 A | 3/1991 | Taylor et al. | |
| 5,928,498 A | 7/1999 | McVicker et al. | |
| 6,103,106 A | 8/2000 | McVicker et al. | |
| 6,495,029 B1 | 12/2002 | Schorfheide et al. | |
| 6,627,110 B1 | 9/2003 | Smith et al. | |
| 6,710,091 B1 | 3/2004 | Womelsdorf et al. | |
| 7,241,481 B2 | 7/2007 | Speer et al. | |
| 7,544,239 B2 * | 6/2009 | Buras et al. ................ | 106/284.3 |
| 7,824,485 B2 * | 11/2010 | Buras et al. ................ | 106/284.3 |
| 7,998,265 B2 * | 8/2011 | Buras et al. ................ | 106/284.3 |
| 2002/0029997 A1 | 3/2002 | Rappas et al. | |
| 2005/0112056 A1 | 5/2005 | Hampden-Smith et al. | |
| 2005/0145137 A1 | 7/2005 | Buras et al. | |
| 2007/0051925 A1 | 3/2007 | Martyak et al. | |

OTHER PUBLICATIONS

M. A. Sayyadnejad et al.; "Removal of hydrogen sulfide by zinc oxide nanoparticles in drilling fluids," Int. J. Environ. Sci. Tech., 5 (4), Autumn 2008, pp. 565-569.

* cited by examiner

*Primary Examiner* — David M Brunsman
(74) *Attorney, Agent, or Firm* — Mossman, Kumar & Tyler, PC

(57) ABSTRACT

Hydrogen sulfide evolution from asphalt may be reduced or eliminated using an additive to act as a scavenger. Zinc oxide, when present in the form of nano-particles is an effective component is preventing or mitigating the evolution of hydrogen sulfide from asphalt. Zinc sulfonate may also be used. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims. 37 CFR 1.72(b).

18 Claims, No Drawings

METHOD FOR REDUCING HYDROGEN SULFIDE EVOLUTION FROM ASPHALT

CROSS REFERENCE TO RELATED APPLICATIONS

This application claims priority from U.S. Provisional Patent Application No. 61/043,935 which was filed on Apr. 10, 2008; and U.S. Provisional Patent Application No. 61/007,168 which was filed on Dec. 11, 2007; and are fully incorporated herein by reference in their entirety.

BACKGROUND OF THE INVENTION

1. Field of the Invention

This invention relates to asphalt production techniques. This invention particularly relates to asphalt production employing chemical additives.

2. Background of the Art

"Kerogen" is generally defined in the art of hydrocarbon production as a solid, insoluble hydrocarbon that has been converted by natural degradation (e.g., by diagenesis) and that principally contains carbon, hydrogen, nitrogen, oxygen, and sulfur. Coal and oil shale are typical examples of materials that contain kerogens. "Bitumen" is generally defined in the art as a non-crystalline solid or viscous hydrocarbon material that is substantially soluble in carbon disulphide.

"Oil" is generally defined as a fluid containing a complex mixture of condensable hydrocarbons. During a refining process, oil is converted into a number of products. For example, gasoline is one such product and is a mixture of low viscosity and volatile hydrocarbons. Lubricating oils is another hydrocarbon product and has higher viscosity and lower volatility. Heavy fuel oils such as "Bunker C" have even greater viscosity and lower volatility. Materials which are even higher in viscosity and lower in volatility, but not quite a solid such as coke, are often also referred to in the art as bitumen and further include many of the non-hydrocarbon components of oil, including elemental sulfur and sulfur containing compounds.

These bitumen and bitumen like products have a surprising number of uses including but not limited to membranes useful for waterproofing roofs, shingle construction, and road construction.

SUMMARY OF THE INVENTION

In one aspect, the invention is a method for reducing hydrogen sulfide emissions from an asphalt composition including admixing an additive with the asphalt composition wherein the additive comprises nano-particles of zinc oxide. In some embodiments, the additive further comprises nano-particles of zinc oxide and zinc carbonate.

In another aspect, the invention is a composition including asphalt and nano-particles of zinc oxide. In some embodiments the additive further comprises nano-particle of zinc oxide and zinc carbonate.

In still another aspect, the invention is a method for reducing hydrogen sulfide emissions from an asphalt composition including admixing an additive with the asphalt composition wherein the additive comprises zinc sulfonate. In some embodiments, the zinc sulfonate is in the form of nano-particles.

In another aspect, the invention is a composition including asphalt and zinc sulfonate and/or zinc oxide. In some embodiments the additive comprises nano-particles of zinc sulfonate and/or zinc oxide.

In still another aspect, the invention is a method for reducing hydrogen sulfide emissions from an asphalt composition including admixing an additive with the asphalt composition wherein the additive comprises at least one member selected from the group consisting of nano-particles of zinc oxide; zinc sulfonate; and nano-particles of zinc sulfonate.

In yet another aspect, the invention is a composition including an asphalt and an additive wherein the additive includes at least one member selected from the group consisting of nano-particles of zinc oxide; zinc sulfonate; and nano-particles of zinc sulfonate.

DETAILED DESCRIPTION OF THE PREFERRED EMBODIMENT

In one embodiment, the invention is a method of reducing hydrogen sulfide emissions from an asphalt composition. For the purposes of this application, the term "asphalt" refers to any of a variety of materials that are solid or semisolid at 25° C. and which may gradually liquefy when heated, and in which the predominant constituents are naturally occurring bitumens (or kerogens) or which are bitumen like materials obtained as residues in, for example, petroleum refining.

Hydrogen sulfide may be present in asphalt as a naturally occurring material, especially in asphalts derived from kerogens. Oil which is heavily contaminated with sulfur, sometimes referred to in the art as sour crude, may also produce bottoms that have carried over hydrogen sulfide. Any asphalt which has a sulfur component may spontaneously emit hydrogen sulfide produced by heating the asphalt.

In one embodiment, hydrogen sulfide present in asphalt is "scavenged" using a method including admixing an additive with the asphalt either prior to or concurrent with heating the asphalt. For the purposes of the present application, the term scavenging means that an additive interacts with hydrogen sulfide in asphalt such that gaseous emissions of hydrogen sulfide from the asphalt are mitigated or eliminated.

The additives of the invention include nano-particles of zinc oxide. These nano-particles may be from 5 to about 250 nm in their largest dimension, often a diameter. In some embodiments, the nano-particles of zinc oxide may have a largest dimension of from about 30 to about 200 nm. In still other embodiments, the largest dimension of the nano-particles may be from about 50 to about 100 nm.

The zinc oxide nano-particle may be made using any method known to those of ordinary skill in the art of preparing such materials to be useful. For example, the particles may be prepared by basic hydrolysis of at least one zinc compound in alcohol or an alcohol/water mixture. In such a method, the hydrolysis is carried out with sub-stoichiometric amounts of base, based on the zinc compound. The precipitate which originally forms during hydrolysis is left to mature until the zinc oxide has completely flocculated. This precipitate is then thickened to give a gel and separated off from the supernatant phase. Such a method is disclosed in U.S. Pat. No. 6,710,091, the contents of which are fully incorporated herein by reference. In another embodiment, the nano-particles may be prepared by other more conventional methods such as cryo-grinding and the like.

The additives of the invention are, in another embodiment, those including zinc sulfonate. The zinc sulfonate may be in the form of an inorganic salt having the general formula:

$$Zn^{2+}(SO_2O^-)_n X^-_y$$

where X is a halide or other anion and n is 1 or 2 and y is 0 or 1 and n+y=2. The inorganic salt may be prepared by any method known to be useful to those of ordinary skill in the art of preparing such compounds.

In another embodiment, the zinc sulfonate is an aromatic or aliphatic sulfonate salt of zinc. In some embodiments, the salts will have the general formula:

$$X^-{}_y(R\text{—}SO_2O^-)_2Zn^{2+}$$

where R has from about 4 to about 30 carbons and X is a halide or other anion and n is 1 or 2 and y is 0 or 1 and n+y=2. R may be aliphatic or aromatic or include aromatic or aliphatic groups. R may include atoms other than carbons, such as oxygen, nitrogen, and halogens subject to the caveat that the atom adjacent to the S is a carbon. In other embodiments, R may have from 6 to about 28 carbons. In still other embodiments, R may have from about 6 to about 12 carbons.

The additives of the invention may include nano-particles of zinc sulfonate. These nano-particles may be from 0.1 to about 250 nm in their largest dimension, often a diameter. In some embodiments, the nano-particles of zinc sulfonate may have a largest dimension of from about 1 to about 50 nm. In still other embodiments, the largest dimension of the nano-particles may be from about 5 to about 25 nm.

In one embodiment of the method of the invention, an additive is admixed with an asphalt. To facilitate the introduction of the additive into the asphalt, it may be desirable to include a solvent or dispersion aid in the additive. Since the asphalt will, in some applications, be heated, it may be desirable to select a solvent or dispersion aid that is compatible with the anticipated temperatures that the additive will experience. For example, in one embodiment, the additive of the invention may include from 50 to 90 weight percent of a mineral spirit, such as an $C_{11}$-$C_{13}$ isoparafin. In another embodiment, the solvent may be a diesel fuel or even kerosene. Commercially available solvents having a mixture of materials therein, such as the DOWANOL® brand solvents may be used.

The additives may be admixed with an asphalt using any method known to be useful to those of ordinary skill in the art. For example, the additive may be introduced into a vessel and then asphalt introduced into the vessel "on top" of the additive and then mixed using a mechanical mixer. In an alternative embodiment, the additive and asphalt are not mixed using a mechanical mixer but rather are admixed by moving the vessel. In still another embodiment, the additive may be introduced as a feed stream into a bottoms separation process in an oil refinery. The additives may be added to asphalt when it is being stored or transported; for example the additives may be added to a storage tank or the hold of a ship either before, during or after asphalt is introduced.

The additive may be introduced into the asphalt at any concentration useful to the intended end result. For example, if complete reduction of hydrogen sulfide is not needed, then the additive may be introduced at a level sufficient to reach a target specification. Those of ordinary skill in the art well know how to determine the appropriate concentration of additive to use to reach a target or specification hydrogen sulfide concentration. Generally though, it may be desirable in some embodiments of the invention to use sufficient additive to introduce from about 250 to 2500 ppm zinc oxide and/or zinc sulfonate into the asphalt. In other embodiments, the concentration may be from 500 to 2000 ppm zinc oxide and/or zinc sulfonate. In still other embodiments, the concentration may be from about 1000 to 1500 ppm zinc oxide and/or zinc sulfonate. Different asphalts and even similar asphalts having differing initial hydrogen sulfide concentrations may require different loadings of the additives of the invention.

The additives of the invention, in some applications, may be most effective when allowed to interact with bitumen over a period of time. For example, once admixed with an asphalt, the additives of the invention may most effectively reduce hydrogen sulfide concentration within the asphalt over the course of a period of from 1 hour to about 4 days.

The additives of the invention, having zinc oxide as a component, may be used at comparatively high temperatures. For example, the additives may be used at temperatures of 425° F. (218° C.) but are also effective at temperatures in the range of 275° F. to 375° F. (135° C. to 190° C.) which is a more commonly used temperature for handling asphalt.

In addition to using additives where the nano-particles are zinc oxide, the method of the invention may also be practiced where the nano-particles include both zinc oxide and zinc carbonate. When zinc-carbonate is present in the nano-particles of the additive, it is desirable present at concentrations of from about 45 weight percent to about 1 weight percent. In some embodiments of the invention, the zinc carbonate is present at weight concentrations of from about 25 weight percent to about 5 weight percent. In still other embodiments, the zinc carbonate is present at weight concentrations of from about 20 weight percent to about 10 weight percent.

While the method of the invention may be practiced with two or more types of nano-particles, it can be desirable in some embodiments to use a single type of homogeneous nano-particles. For example, in one embodiment of the invention, the method of the invention may be practiced using an additive having homogeneous nano-particles of substantially pure zinc oxide, but in another embodiment, the nano-particle may still be homogeneous but consist of an admixture of zinc oxide and zinc carbonate. In still other embodiments of the invention, the nano-particles may consist of admixtures of zinc oxide and zinc carbonate of varying concentrations. In still another embodiment, the nano-particles may consist of particles of substantially pure zinc oxide and particles of substantially pure zinc carbonate.

EXAMPLES

The following examples are provided to illustrate the invention. The examples are not intended to limit the scope of the invention and they should not be so interpreted. Amounts are in weight parts or weight percentages unless otherwise indicated.

Example 1

A nano-particle zinc oxide dispersed in mineral spirits is used to treat a 58-28 grade asphalt bottoms product from an oil refinery. The zinc oxide has a particle size range of from 50-80 nm. The zinc oxide dispersion is introduced into a clean paint can in the amounts shown below in Table 1. 500 ml of asphalt is introduced into the paint can the paint can is sealed. The sample within the paint can is maintained at 350° C. using an oven. The additive is admixed with the asphalt by shaking the paint cans using a shaker table. At the times indicated in Table 1, the paint cans are pierced and the hydrogen sulfide concentration in the head space within the paint can is determine using a Dräger® tube. Results are shown below in Table 1.

TABLE 1

| Sample ID | Additive Concentration ppm | 2 Hours [H$_2$S] ppm | 4 Hours [H$_2$S] ppm | 18 Hours [H$_2$S] ppm | 24 Hours [H$_2$S] ppm |
|---|---|---|---|---|---|
| 1-1 | 62 | 3500 | 7000 | 5400 | 5000 |
| 1-2 | 125 | 5750 | 3500 | 3000 | 1500 |
| 1-3 | 250 | 7000 | 3000 | 2000 | 950 |
| 1-4 | 500 | 5500 | 3500 | 2100 | 120 |
| 1-5 | 1000 | 2000 | 1700 | 140 | 100 |

Example 2

Example 1 is reproduced except that a different sample of asphalt is used and, in samples 2A and 2C, the zinc oxide has different particle sizes and, in Sample 2B, the particles are about 90 wt % ZnO and 10 wt % ZnCO$_3$. The results as shown below in Table 2.

TABLE 2

| Sample ID | Additive Concentration ppm | Particle Size nm | 2 Hours [H$_2$S] ppm | 24 Hours [H$_2$S] ppm |
|---|---|---|---|---|
| 2-A1 | 250 | 50-80 | 2200 | 200 |
| 2-A2 | 500 | 50-80 | 400 | 15 |
| 2-A3 | 750 | 50-80 | 110 | 25 |
| 2-A4 | 100 | 50-80 | 25 | 5 |
| 2-B1 | 250 | 160 | 950 | 20 |
| 2-B2 | 500 | 160 | 225 | 5 |
| 2-B3 | 750 | 160 | 15 | 30 |
| 2-B4 | 100 | 160 | 4 | 40 |
| 2-C1 | 250 | 196 | 2200 | 1200 |
| 2-C2 | 500 | 196 | 650 | 700 |
| 2-C3 | 750 | 196 | 700 | 50 |
| 2-C4 | 100 | 196 | 200 | 25 |

Comparative Examples 3 & 4

Example 1 is reproduced except that other hydrogen sulfide scavengers are used instead of the nano-particle zinc oxide of the invention. Sample 3-A is an iron carboxylate prepared using ethylhexanoic acid. It is present at a concentration of 5-6% Fe metal. Example 3-B is the condensation product of butyl aldehyde and ethanol amine. It is present at a concentration of 70 percent by weight in kerosene. The results are displayed below in Table 3.

TABLE 3

| Sample ID | Additive Concentration ppm | 2 Hours [H$_2$S] ppm | 4 Hours [H$_2$S] ppm | 18 Hours [H$_2$S] ppm | 24 Hours [H$_2$S] ppm |
|---|---|---|---|---|---|
| 3-A1 | 125 | 7000 | 6500 | 11000 | 9000 |
| 3-A2 | 250 | 4500 | 6000 | 10000 | 1000 |
| 3-A3 | 500 | 3500 | 6000 | 7500 | 6000 |
| 3-A4 | 1000 | 3000 | 3500 | 4500 | 3000 |
| 3-A5* | 2000 | 500 | 75 | 225 | 225 |
| 3-B1 | 500 | 4000 | 5500 | 5000 | 8000 |
| 3-B2 | 1000 | 3500 | 3500 | 2100 | 7000 |
| 3-B3 | 2000 | 2000 | 2500 | 1150 | 4500 |
| 3-B4 | 4000 | 1750 | 1500 | 110 | 1500 |
| 3-B5 | 5000 | 1500 | 400 | 90 | 75 |

*Samples results may be unreliable.

Example 5

A nano-particle zinc sulfonate dispersed in mineral spirits is used to treat a 58-28 grade asphalt bottoms product from an oil refinery. The zinc sulfonate has a particle size of less than 20 nm. The zinc sulfonate dispersion is introduced into a clean paint can in the amounts shown below in Table 1. 500 ml of asphalt is introduced into the paint can and the paint can is sealed. The sample within the paint can is maintained at 350° C. using an oven. The additive is admixed with the asphalt by shaking the paint cans using a shaker table. At the times indicated in Table 4, the paint cans are pierced and the hydrogen sulfide concentration in the head space within the paint can is determine using a DRÄGER® tube. Results are shown below in Table 4.

TABLE 4

| Sample ID | Additive Concentration ppm | 4 Hours [H$_2$S] ppm | % Reduction of H$_2$S |
|---|---|---|---|
| Blank | | 5000 | — |
| 1-A1 | 250 | 500 | 82 |
| 1-A2 | 500 | 100 | 96 |
| 1-A3 | 1000 | 70 | 98 |

Example 6

Example 5 is reproduced except that a different sample of asphalt is used, the oven is maintained at 300° F., and the samples are held for a longer period. The results as shown below in Table 5.

TABLE 5

| Sample ID | Additive Concentration ppm | 24 Hours [H$_2$S] ppm | 48 Hours [H$_2$S] ppm |
|---|---|---|---|
| Blank | | 10,000 | 10,000 |
| 2-A1 | 100 | 5,000 | 2,000 |
| 2-A2 | 250 | 2,000 | 800 |
| 2-A3 | 500 | 400 | <10 |
| 2-A4 | 1000 | 10 | <10 |

What is claimed is:

1. A method for reducing hydrogen sulfide emissions from an asphalt composition comprising admixing an additive with the asphalt composition wherein the additive comprises nano-particles of zinc sulfonate.

2. The method of claim 1 wherein the additive further comprises nano-particles of zinc oxide and/or zinc carbonate.

3. The method of claim 1 wherein the nano-particles are from about 5 to about 250 nm in their largest dimension.

4. The method of claim 3 wherein the nano-particles are from about 30 to about 200 nm in their largest dimension.

5. The method of claim 4 wherein the nano-particles are from about 50 to about 100 nm in their largest dimension.

6. The method of claim 1 wherein the additive is present in the asphalt at a concentration of from about 250 to 2500 ppm by weight of zinc oxide and/or zinc sulfonate.

7. The method of claim 6 wherein the additive is present in the asphalt at a concentration of from about 1000 to 1500 ppm by weight of zinc oxide and/or zinc sulfonate.

8. The method of claim 1 wherein the additive and the asphalt are introduced into a vessel and then mixed using a mechanical mixer.

9. The method of claim 1 wherein the asphalt and the additive are introduced into a vessel and the additive is admixed with the asphalt by movement of the vessel.

10. The method of claim 1 wherein the asphalt is a product of a bottoms separation process in an oil refinery and the additive is introduced into a feed stream of the bottoms separation process.

11. The method of claim 1 wherein the asphalt and the additives are added to a storage tank or the hold of a ship before, during or after the asphalt is introduced into the storage tank or hold.

12. The method of claim 1 wherein the additive and the asphalt are admixed at a temperature of from about 275° F. (135° C.) to about 425° C. (190° C.).

13. The method of claim 1 wherein the additive is in the form of a solution in a solvent.

14. The method of claim 13 wherein the solvent is selected from the group consisting of mineral spirits, diesel fuel and kerosene.

15. The method of claim 1 wherein the additive further comprises a dispersion aid.

16. A composition comprising an asphalt and an additive wherein the additive comprises nano-particles of zinc sulfonate.

17. The composition of claim 16 wherein the asphalt comprises naturally occurring bitumens or kerogens.

18. The composition of claim 16 wherein the asphalt comprises residues from petroleum refining.

\* \* \* \* \*